United States Patent [19]

Farr

[11] 4,433,873
[45] Feb. 28, 1984

[54] CONTROL VALVE ASSEMBLY

[75] Inventor: Glyn Phillip R. Farr, Warwick, Great Britain

[73] Assignee: Lucas Industries Limited, Birmingham, England

[21] Appl. No.: 298,191

[22] Filed: Aug. 31, 1981

[30] Foreign Application Priority Data

Aug. 29, 1980 [GB] United Kingdom ............... 8028069

[51] Int. Cl.³ .............................................. B60T 8/16
[52] U.S. Cl. .................................. 303/24 A; 303/6 A
[58] Field of Search ................... 188/181 A; 303/6 L, 303/6 R, 24 A, 24 C, 24 F

[56] References Cited

U.S. PATENT DOCUMENTS 4,260,196 4/1981 Takata ............................ 303/24 A Primary Examiner—Duane A. Reger
Attorney, Agent, or Firm—Scrivener, Clarke, Scrivener and Johnson

[57] ABSTRACT

An apportioning valve for controlling the pressure applied to the rear brakes of a vehicle comprises an inlet to receive actuating fluid and an outlet for connection to the rear brakes. The inlet and outlet are normally connected via an inlet chamber, and an auxiliary chamber is connected to the inlet chamber via a throttle and to a vent valve seat. A pendulum is biased against the valve seat during deceleration and thus closes the valve seat and allows pressure to build up in auxiliary chamber. When pressure in the auxiliary chamber is sufficiently high control pistons move to isolate the inlet from the outlet.

9 Claims, 3 Drawing Figures

CONTROL VALVE ASSEMBLY

This invention relates to control valve assemblies for vehicle braking systems and is particularly concerned with such assemblies which incorporate a brake pressure proportioning valve for controlling the brake pressure applied to the rear wheel brakes.

Proportioning valves are known which reduce the pressure applied to the rear wheel brakes, as compared to the full pressure applied to the front wheel brakes, after a predetermined cut-in pressure is attained.

It has previously been proposed to alter the cut-in pressure of such valves in response to the deceleration of the vehicle. This may be done by use of a ball or a pendulum, movement of which relative to remainder of the vehicle in response to deceleration modifies the operation of the proportioning valve to take account of the deceleration of the vehicle and thus the shift of load from the rear to the front wheels which occurs during braking. Such valves using a deceleration conscious mechanism to modify the cut-in pressure of the proportioning valve ensure that when the vehicle is laden the cut-in pressure is greater than when the vehicle is unladen.

Such valves have the problem that during sudden braking, for example in an emergency stop, the full source pressure may be passed through the proportioning valve before the deceleration sensing means modifies the operation of the proportioning valve so that the rear brakes may be over-braked with the consequence that wheel lock may result. In trucks such wheel lock could be very dangerous and in articulated vehicles could cause jack-knifing.

In previously proposed assemblies described in U.S. Pat. Nos. 4,314,731 and 4,360,238, assigned to the same assignee as the present application, it was proposed to overcome the problem by providing a control valve assembly for a vehicle braking system, comprising an inlet, air outlet, a proportioning valve having a control valve member movable to open and close said valve to control communication between said inlet and said outlet and means responsive to deceleration of the vehicle and operable to reduce the pressure at said outlet after said valve has closed.

According to the present invention there is provided a brake pressure control valve for location between a source of brake actuating fluid and the wheel brakes of a vehicle to control the fluid pressure applied to said wheel brakes during brake application, the control valve comprising: an auxiliary control chamber, a source of operating fluid connected at all times during brake application to the auxiliary control chamber; a vent valve formed by a fixed valve seat and by a portion of a deceleration responsive member which, upon sensed deceleration, engages the valve seat to close the vent valve; and means connecting the vent valve to the auxiliary control chamber whereby, upon sensed deceleration closure of the vent valve allows pressure within the auxiliary control chamber to increase until the pressure within the auxiliary control chamber acting over the area of the vent valve seat produces on the deceleration responsive member a force equal to the force with which the deceleration responsive member is urged by the sensed deceleration against the vent valve seat.

Some forms of control valve assemblies in accordance with the invention for vehicle braking systems will now be described, by way of example with reference to the accompanying drawings, in which.

Reference may be had to our British Patent Applications Nos. GB 2,010,996A and GB 2,051,275A for a better understanding of the background to the following description.

Figure 1:
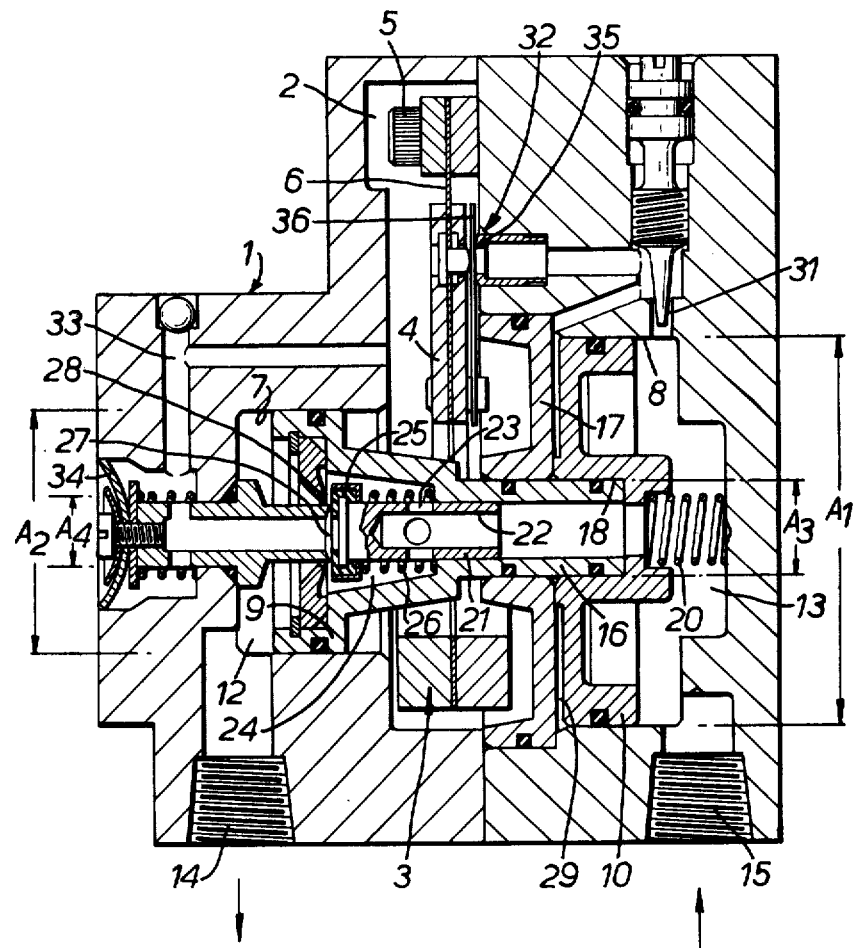
FIG. 1 is an axial cross-sectional view of one form of control valve assembly.

Referring to FIG. 1, the control valve assembly is designed for use in an air braking system and comprises a housing 1 having an internal chamber 2 in which an inertia-responsive device in the form of a pendulum 3 is pivotally mounted. The pendulum 3 has an arm 4 which is secured by a bolt 5 to the housing and which has a spring steel strip portion 6.

Slidably mounted in co-axial bores 7,8 within the housing 1 are two pistons 9,10 which have different cross-sectional areas and which define with the housing outlet and inlet pressure chambers 12,13 respectively, the outlet chamber 12 having an outlet port 14 for connection to the vehicle rear wheel brakes (not shown) and the inlet chamber 13 having an inlet port 15 for connection to a pressure source (not shown). The pistons 9,10 are connected in thrust-transmitting engagement by a tubular extension part 16 which extends sealingly through a fixed partition 17. In the illustrated form of assembly, the part 16 is integral with left-hand piston 9 and extends sealingly into a bore 18 formed in the right-hand piston 10. The pistons are biased leftwardly to an illustrated inoperative position by a spring 20.

Within the extension part 16 is slidable a stem 21 having an axial bore 22 and radial ports 23 which connect the inlet chamber 13 with a chamber 24 formed within left-hand piston 9 intermediate the inlet and outlet chambers 13,12. The stem 21 carries a valve closure member 25 which is biased by a spring 26 into engagement with a fixed exhaust valve seat 27. When the left-hand piston moves rightwardly, the closure member 25 is engaged by another valve seat 28 of an outlet valve which controls communication between the outlet chamber 12 and the intermediate chamber 24.

Defined between the inlet right-hand piston 10 and the partition 17 is an auxiliary chamber 29 which is connected through a throttle 31 to the inlet chamber 13 and through a pendulum-controlled auxiliary valve 32 to internal chamber 2 which is vented to atmosphere through passageway 33 and a one-way valve 34. The auxiliary valve 32 comprises an annular seat 35 which, in the normal position of the pendulum, is lightly engaged by a plate 36 located on the pendulum arm 4.

Operation of the valve assembly will now be described. Inlet pressure from a suitable source, for example a remote foot valve supplied by a compressed air reservoir, enters inlet chamber 13 through inlet port 15 and passes through the bore 22 and ports 23 of stem 21 to the intermediate chamber 24. Since the outlet valve is open, the inlet pressure passes to the outlet chamber 12 and outlet port 14 to the rear wheel brakes. The outlet pressure acts on the left-hand face of piston 9.

Simultaneously, a pressure is admitted from the inlet chamber 13 to the auxiliary chamber 29, that pressure being less than inlet pressure due to the throttle 31. The reduced pressure also acts on the pendulum 3 over the area of the auxiliary valve seat 35 thereby tending to move the pendulum to the left as viewed in FIG. 1 and thereby open the valve 32 to vent the chamber 29.

However, applied braking pressure causes a deceleration of the vehicle which urges the pendulum rightwardly against the valve seat 35. Thus, the valve 32 remains closed until an equilibrium state is reached in which the pressure in auxiliary chamber 29 acting over the area of valve seat 35 equals the deceleration force on the pendulum. The reduced inlet pressure existing in auxiliary chamber 29 is thus dependent upon the pendulum force, and thereby on vehicle deceleration. That reduced inlet pressure acts on the left-hand side of piston 10 in concert with the outlet pressure acting on the left-hand side of piston 9, against the effect of inlet pressure on the right-hand side of piston 10 and the load of spring 20. When the inlet pressure reaches a sufficient level, the pistons move rightwardly, closing the outlet valve. Should the rear brake pressure be too high, the pistons continue to move and the exhaust valve formed by seat 27 and closure member 25 opens to reduce the rear brake pressure. Thereafter, as the inlet pressure and the deceleration vary, the outlet and exhaust valves open and close to provide an outlet pressure which is dependent upon vehicle deceleration and inlet pressure.

If the total area of piston 10 is $A_1$, the total area of piston 9 is $A_2$, the total area of stem 21 is $A_3$ and the area of outlet valve seat 28 is $A_4$, then the equilibrium equation for the assembly, when the exhaust and outlet valves are in lap condition is:

$$P_1A_1+F=P_2(A_2-A_4)+P_3(A_1-A_3)$$

where
$P_1$ is the inlet pressure
$P_2$ is the outlet pressure
$P_3$ is the throttled pressure (in auxiliary chamber 29)
F is the force of spring 20.

It will be appreciated that the valve of FIG. 1 may readily be modified for use in a pressurised hydraulic braking system.

Figure 2:
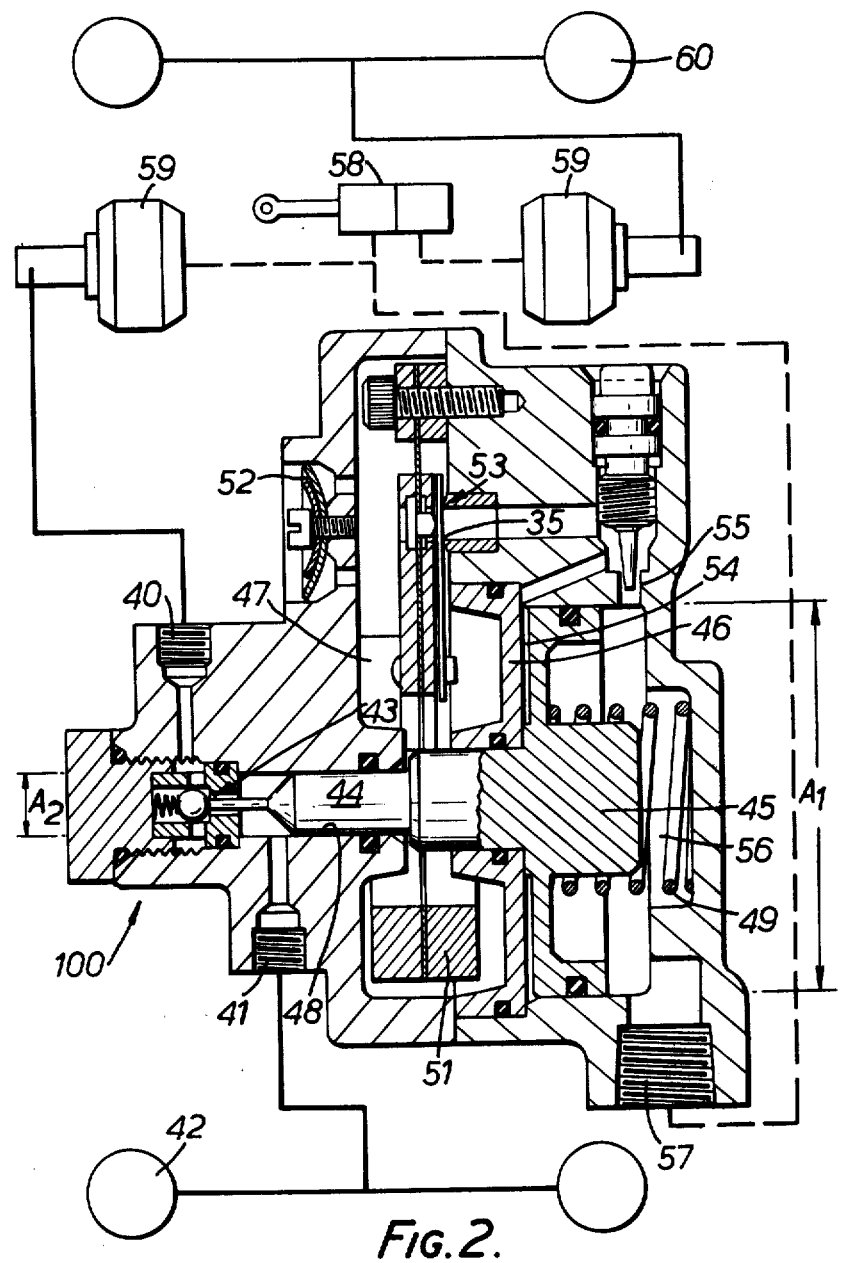
FIG. 2 is an axial cross-sectional view of another form of control valve assembly incorporated in a brake circuit.

In FIG. 2 there is shown a form of control valve assembly 100 for air hydraulic wheel brakes.

Communication between a hydraulic inlet 40 and an outlet 41 connected to the rear wheel brakes 42 is in this embodiment controlled by a metering ball valve 43 which in the illustrated inoperative condition is held open by an extension 44 of an input piston 45. The extension 44 passes sealingly through a fixed partition 46 and an internal chamber 47 into a bore 48. A control spring 49 biases the piston 45 to its inoperative position.

As in the previously described embodiment a pendulum 51 is pivotally mounted in chamber 47, which is vented to atmosphere through a one-way valve 52, and normally closes an auxiliary valve 53. The valve 53 controls communication between chamber 47 and an auxiliary chamber 54 defined between piston 45 and partition 46. A throttle 55 is located between auxiliary chamber 54 and an input chamber 56 having a port 57 connected to a foot valve 58. The foot valve 58 operates two air/hydraulic actuators 59, one of which is connected directly to the front wheel brakes 60 and the other of which is connected to the inlet 40.

The operation of the valve assembly will now be described.

When the foot valve 58 is operated to apply the air/-hydraulic actuators 59 compressed air is supplied to port 57 and the control piston 45 is urged to the left so that hydraulic pressure can pass freely, via the ball valve 43 from the rear brake actuator 59 to the rear brakes 42. This hydraulic pressure produces a force on the extension 44 in opposition to the applied load. At the same time vehicle deceleration causes the pendulum 51 to act against the auxiliary valve seat 35 to control the pressure in auxiliary chamber 54 as described above with reference to FIG. 1. The input pressure is of course the foot valve applied air pressure. Pressure in the auxiliary chamber builds up until this pressure acting over the area of valve seat 35 equals the force with which the pendulum engages the seat 35. The valve is in balance when:

$$P_2A_2+Kf/g=P_1A_1+S$$

where
$P_1$ = air input pressure from the foot valve
$P_2$ = rear brake pressure (hydraulic)
K = force proportional to deceleration S = load of spring 49
$A_1$ = effective area of piston 45
$A_2$ = effective area of extension 44
f/g = deceleration The areas $A_1,A_2$ and factor K can be chosen to give the correct relationship to the applied front and rear pressure for the unladen and laden case.

For example, when unladen for a given applied pressure $P_1$, the K factor will be large and $P_2$ will accordingly be low. When laden, K is small and $P_2$ increases relative to $P_1$.

If the vehicle is fitted with a dual system where the rear brakes are applied by different brake circuits then the pendulum could operate a balance bar onto two valve seats to control two separate control piston assemblies.

The assembly is also suited to a system utilizing a power hydraulic servo that operates a master cylinder. In this case the servo pressure would be connected to the inlet port 57 as well as to the inlet port 40 and the pendulum would be housed in a chamber connected to the fluid reservoir.

The assembly of FIG. 2 could be modified by connecting inlet 57 to a servo vacuum pressure, the chamber 47 also being connected to the servo vacuum. Those skilled in the art will appreciate that with such a modification, the assembly will still operate in the manner described.

Figure 3:
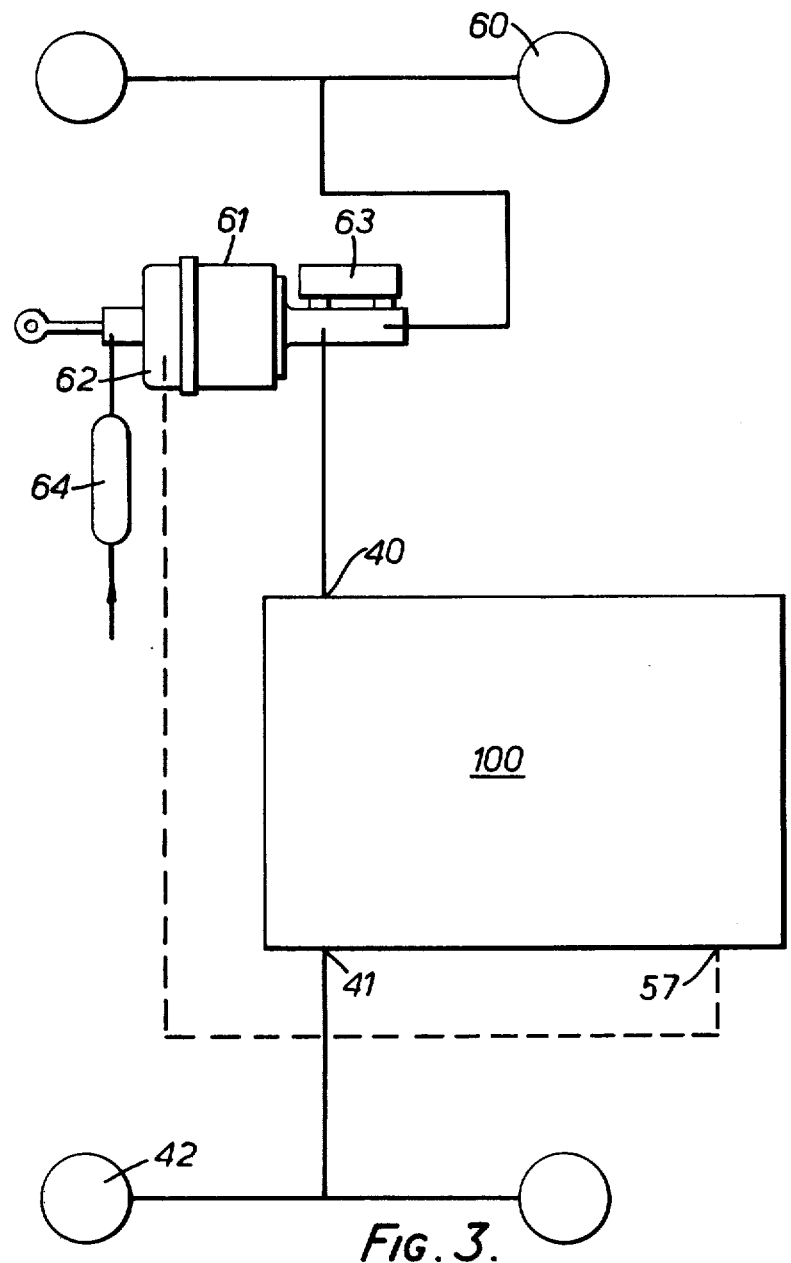
FIG. 3 is a diagrammatic view of an alternative brake circuit incorporating the valve assembly of FIG. 2.

FIG. 3 illustrates how the valve assembly of FIG. 2 can be incorporated in a brake system having an air powered direct servo 61 actuating a master cylinder. In that case the servo actuator 62 operates a tandem master cylinder 63, one chamber of which is connected to the front brakes 60 and the other chamber of which is connected through inlet 40 and outlet 41 to rear wheel brakes 42. The input port 57 is connected to the servo 61, the servo being supplied with compressed air from a reservoir 64.

Operation of the assembly of FIG. 3 is similar to that of FIG. 2 and needs no further description here.

In each of the above-described embodiments, the valve assembly is arranged such that the deceleration force (Kf/g) determines the difference between the force on the input piston area ($P_1A_1$) less the force at the output ($P_2A_2$). However, in certain vehicles, particularly those with high centres of gravity, for example vans and lorries, it has been found that the required valve characteristics may be substantially different. Modified embodiments of the invention in which the inlet pressure and the outlet pressure are additive may be found more satisfactory for these vehicles.

The above described valve assemblies overcome the problem which arises in the previously proposed arrangements which use a movable control valve member to meter pressure. The problem has been overcome by using a fixed valve seat for the auxiliary valve engageable by the pendulum and in combination with a throttle, thereby providing a pressure force proportional to deceleration without the need for the movable control valve member.

Thus, the problem associated with the movable control valve member, which in certain cases operated in a hostile environment subjected to changing atmospheric air, is obviated and also only small movements of the pendulum are required.

Furthermore, should the pendulum fail, in each of the above-described embodiments pressure is fed to the outlet on a 1:1 ratio with inlet pressure.

I claim:

1. A brake pressure control valve for location between a source of brake actuating fluid and the wheel brakes of a vehicle to control the fluid pressure applied to said wheel brakes during brake application, the control valve comprising: an inlet chamber the pressure within which is under driver control; an outlet chamber connected to said wheel brakes; control piston means exposed to the pressures prevailing in said inlet chamber and said outlet chamber respectively; an auxiliary control chamber bounded on one side by said control piston means; a source of operating fluid connected at all times during brake application to said auxiliary control chamber; and deceleration responsive vent valve means for controlling the venting of the auxiliary chamber to establish therein a working pressure dependent on vehicle deceleration, said vent valve means including a fixed vent valve seat and a deceleration responsive member which, upon sensed deceleration, engages the vent valve seat to close the vent valve means thereby allowing pressure within the auxiliary control chamber to increase until such pressure acting over the area of the vent valve seat overcomes the force with which the deceleration responsive member is urged by the sensed deceleration against the vent valve seat.

2. A brake pressure control valve according to claim 1, wherein said inlet chamber is connected to a source of brake actuating fluid, the control valve being operative when the pressure in the inlet chamber is below a cut-in pressure to provide free communication between the inlet chamber and the outlet chamber and being operative when pressure in the inlet chamber is above the cut-in pressure to control communication between the inlet chamber and the outler chamber in order to provide a pressure in the outlet chamber which is below the pressure in the inlet chamber.

3. A brake pressure control valve according to claim 1 wherein the inlet chamber is separated from the auxiliary control chamber by said control piston means whereby fluid pressure within the inlet chamber and within the auxiliary control chamber urge the control piston means in opposite directions.

4. A brake pressure control valve according to claim 3 wherein the auxiliary control chamber is connected to the inlet chamber to provide said connection between the auxiliary control chamber and the source of operating fluid.

5. A brake pressure control valve according to claim 4 wherein a throttle is provided between the inlet chamber and the auxiliary control chamber.

6. A brake pressure control valve according to claim 1 or 2 wherein said source of operating fluid is said source of brake actuating fluid.

7. A brake pressure control valve according to 1 or 2 wherein said source of operating fluid is the output of an air valve which supplies air to an air powered hydraulic brake actuator and said source of actuating fluid is the output of said hydraulic brake actuator.

8. A brake pressure control valve according to claim 1 or 2 wherein the vent valve vents into an internal chamber of the control valve in which the deceleration responsive member is housed.

9. A brake pressure control valve according to claim 8 wherein the operating fluid is compressed air and said internal chamber is vented to atmosphere.

* * * * *